(12) United States Patent
Brosnan et al.

(10) Patent No.: US 7,283,702 B2
(45) Date of Patent: Oct. 16, 2007

(54) METHOD AND APPARATUS FOR OPTIMIZING THE TARGET INTENSITY DISTRIBUTION TRANSMITTED FROM A FIBER COUPLED ARRAY

(75) Inventors: Stephen J. Brosnan, San Pedro, CA (US); Michael G. Wickham, Rancho Palos Verdes, CA (US); Hiroshi Komine, Torrance, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 118 days.

(21) Appl. No.: 11/227,898

(22) Filed: Sep. 15, 2005

(65) Prior Publication Data

US 2007/0217740 A1    Sep. 20, 2007

(51) Int. Cl.
G02B 6/32    (2006.01)
G02B 3/02    (2006.01)

(52) U.S. Cl. .......................... 385/33; 385/39; 359/708; 359/717; 359/754

(58) Field of Classification Search ................... 385/15, 385/33, 39; 359/642, 708, 717, 754
See application file for complete search history.

(56) References Cited

U.S. PATENT DOCUMENTS 3,476,463 A    11/1969    Cohn 6,639,733 B2 *    10/2003    Minano et al. ............. 359/728
6,980,717 B2 *    12/2005    Watanabe et al. ............. 385/33

OTHER PUBLICATIONS

John A. Hoffnagle et al., "Design and performance of a refractive optical system that converts a Gaussian to a flattop beam" Appl. Optics, vol. 39, No. 30, pp. 5488-5499, Oct. 2000.

* cited by examiner

*Primary Examiner*—Frank G. Font
*Assistant Examiner*—Michael P. Mooney
(74) *Attorney, Agent, or Firm*—Carmen B. Patti & Assoc., LLC

(57) ABSTRACT

Encircled far field energy is substantially increased by modifying the near field energy distribution of radiation from each fiber in an emitting array. Each beamlet output from a fiber is modified to have a generally uniform cross-sectional energy distribution, using a pair of aspheric optical elements selected for that purpose. The optical elements may be refractive or reflective. The modified beamlets combine to form a composite output beam with a generally uniform energy distribution. Preferably, the composite beam is subject to an array-wide inverse transformation to a near-Gaussian distribution, further enhancing the encircled far field energy and providing a more efficient high power laser source. Further gains in efficiency are achieved by selecting a fiber bundle pattern, lens array pattern and lens shape that together result in a high fill factor.

20 Claims, 2 Drawing Sheets

METHOD AND APPARATUS FOR OPTIMIZING THE TARGET INTENSITY DISTRIBUTION TRANSMITTED FROM A FIBER COUPLED ARRAY

BACKGROUND OF THE INVENTION

This invention relates generally to generation of high power laser beams using arrays of optical fibers and, more particularly, to techniques for more efficiently combining multiple beams emanating from an array of fiber elements. Fiber arrays have been employed to combine the relatively small powers output from the individual fibers, to generate a composite beam of much higher power. Such arrays are well known to have a number of directed energy applications in both military and commercial contexts.

When multiple sub-beams or "beamlets" from separate fibers in an array are combined to form a single composite beam, the energy distribution across the composite beam is an important factor that provides a measure of the efficiency of the beam. In the near field, close to the ends of the radiation emitting fibers, the individual beamlets retain their character as separate sources of radiation, and there will necessarily be distinct spaces between the beamlets. At distances farther from the array of fibers, the beamlets have diffracted and diverged to an extent that they overlap and merge. In most applications of high power lasers, the nature of the resulting composite beam at distances comparable to the "far field" is what is of greatest interest. The far field is generally defined as being at or beyond the distance at which the angular field distribution is independent of the distance from the radiation source. The far field distance is proportional to the square of the diameter of the source, and is inversely proportional to the source wavelength.

Unfortunately, even if the beamlets from individual fibers are collimated the resulting far field energy distribution pattern is characterized by a central lobe and a number of smaller side lobes surrounding the central lobe. The far field encircled energy may be defined as the percentage of total energy that falls within a prescribed circle in the far field. Typically the circle is defined to encompass the energy in the central lobe and to exclude the side lobes. The encircled far field energy, when expressed as a percentage of the total energy emitted by the fiber array, provides a measure of the efficiency of the optical system that produces the composite beam, the assumption being that energy falling outside the prescribed circle is wasted.

The far field encircled energy depends on several physical and optical parameters of the array, including fiber array pattern and specifically its "fill" factor, the emission profile of each fiber, and the overall emission profile of the composite beam. Prior to this invention, attempts to scale to higher power outputs by combining beamlets from multiple fibers have resulted in a significant fraction of the output power falling outside the central lobe, even when collimating lenses are used. This phenomenon is due in part to near field intensity modulation across the array. A far field encircled energy of approximately 60% was considered normal prior to the invention. Increasing the encircled energy provides increased energy at the target of the composite beam, minimization of stray light, in the side lobes, and increased overall efficiency. Increased overall efficiency translates, of course, into the ability to produce a prescribed energy beam with a system that uses less power and has lower weight, or permits the generation of higher energy beams without increasing the power and weight of the system.

It will be appreciated that there is a significant need for a technique for optimizing energy distribution and, more specifically, increasing far field encircled energy, in a beam that combines beamlets emitted from an array of fibers, thereby increasing the overall efficiency of a high power laser source. The present invention satisfies this need.

SUMMARY OF THE INVENTION

The present invention resides in apparatus, and a related method, for combining radiation emitted from an array of fibers in such a way as to provide an optimum energy distribution at a given range from the array, and in particular to provide a much improved encircled far field energy efficiency. Although there are a number of possible implementations that fall within the scope of the invention, they are generally all characterized by the use of pairs of optical elements, which may be refractive or reflective, to modify the optical output mode of each fiber to one that has a generally uniform intensity distribution with flat phase, and preferably, the use of similar optical elements to transform an array-wide composite beam to one that has a desired intensity distribution.

Briefly, and in general terms, the apparatus of the invention comprises an array of optical fibers, each of which emits electromagnetic radiation with a characteristic cross-sectional energy distribution; and first and second arrays of optical elements aligned to receive radiation from the array of fibers. Each optical element in the first array is an aspheric element designed to produce a uniform cross-sectional energy distribution without regard to perfect beam collimation, and each optical element in the second array is an aspheric element designed to collimate radiation transmitted from the corresponding optical element in the first array. The combined first and second arrays of optical elements produce an array output of beamlets that form a composite output beam with a generally uniform cross-sectional energy distribution that results in an increased far field encircled energy. The first and second arrays of optical elements may include either reflective or refractive elements, or a combination of both.

Preferably, the apparatus further comprises first and second array-wide optical elements, disposed in the composite output beam to effect an inverse transformation of the composite output beam from a generally uniform energy distribution to a more desirable energy distribution that results in an optimal energy distribution at a given range from the array. More specifically, the optimal energy distribution increases the encircled energy at the far field, or at a shorter, intermediate field range, depending on the application of the beam.

For further enhancement of the far field encircled energy, the elements of the invention are configured to provide a high fill factor. For example, the array of fibers may have individual fibers centered on a uniformly spaced matrix pattern and the corresponding first and second arrays have their optical elements centered on a similar matrix pattern to receive radiation from the fibers. For example, the fibers may be arranged with their centers on a square matrix and the optical elements in the first and second arrays may also be square in cross-sectional shape, to provide a large fill factor that also contributes to an increase in the far field encircled energy. Alternatively, the fibers may be arranged on a hexagonal matrix pattern and the optical element arrays similarly configured to provide a high fill factor.

In terms of a novel method for providing increased encircled far field energy in a high power laser, the invention comprises the steps of emitting electromagnetic radiation from each element of an array of optical fibers; and aligning first and second arrays of optical elements to receive radiation from the array of fibers. Each optical element in the first array is an aspheric element designed to produce a uniform cross-sectional energy distribution without regard to perfect beam collimation, and each optical element in the second array is an aspheric element designed to collimate radiation transmitted by the corresponding optical element in the first array. Thus, the method also comprises producing in the combined first and second arrays of optical elements an array of output beamlets that together form a composite output beam with a generally uniform cross-sectional energy distribution that results in an increased far field encircled energy.

The method also preferably comprises the step of disposing first and second array-wide optical elements in the composite output beam to effect an inverse transformation of the composite output beam from a generally uniform energy distribution to a more desirable energy distribution that further increases the far field encircled energy.

The method may further comprise centering individual fibers in the array of fibers on a square or hexagonal matrix pattern; and centering individual optical elements of the first and second arrays on a similar square or hexagonal matrix pattern to receive radiation from the fibers. The optical elements in the first and second arrays are square or hexagonal in cross-sectional shape to provide a large fill factor that also contributes to an increase in the far field encircled energy.

It will be appreciated from the foregoing summary that the present invention represents a significant advance in systems for the generation of high power laser beams. In particular, the invention provides a laser beam having an enhanced far field encircled energy, expressed as an efficiency. More generally, the invention provides a technique for controlling near field phase and amplitude to produce an optimum energy distribution at a given range from the array. Other aspects of this invention will become apparent from the following more detailed description, taken in conjunction with the accompanying drawings

DETAILED DESCRIPTION OF THE INVENTION

Figure 1:
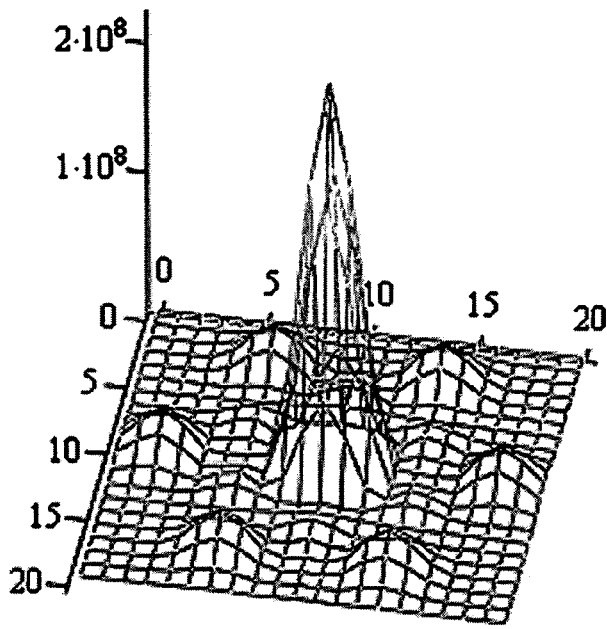
FIG. 1 is three-dimensional graph depicting the far field energy distribution resulting from radiation from an array of seven fibers.

As shown in the drawings for purposes of illustration, the present invention concerns a technique for combining multiple beamlets emitted from a fiber array, in such a way as to significantly increase the encircled far field energy resulting from the radiation from the overall array. Because of diffraction effects, radiation from an array of fibers does not combine very efficiently into a single more powerful beam. Ideally, such a composite beam should have practically all of its energy confined to a central peak, preferably of Gaussian shape, but arrays typically produce a far field energy distribution in which a significant proportion of the energy falls outside the central peak. Thus the encircled energy at the far field may be as low as 60% or less. FIG. 1 shows the far field energy distribution resulting from radiation from an array of seven fibers, including one central fiber surrounded by six other fibers in a hexagonal pattern. The far field energy distribution is dominated by a central lobe to which all of the fibers contribute, but there remain six surrounding side lobes that contribute nothing to the central energy lobe.

In accordance with the invention, the far field encircled energy is significantly increased by the use of refractive or reflective optical elements to modify the energy distribution in the near field, by transforming the energy distribution of each beamlet in the array to a more uniform distribution, and preferably by transforming the energy distribution of the array-wide beam to a more desirable one, such as a Gaussian distribution. The encircled energy at the far field is further enhanced by designing the array elements and their associated transformation lenses to provide a high fill factor. The fill factor of the array is the ratio of the combined cross-sectional areas of beamlets emitted by the fibers to the total area of the array, including gaps between the fibers arising because of imperfect packing geometry. As will be further discussed below, the encircled far field energy is further enhanced by using fiber arrays and optical element arrays that result in a fill factor approaching unity.

Figure 2:
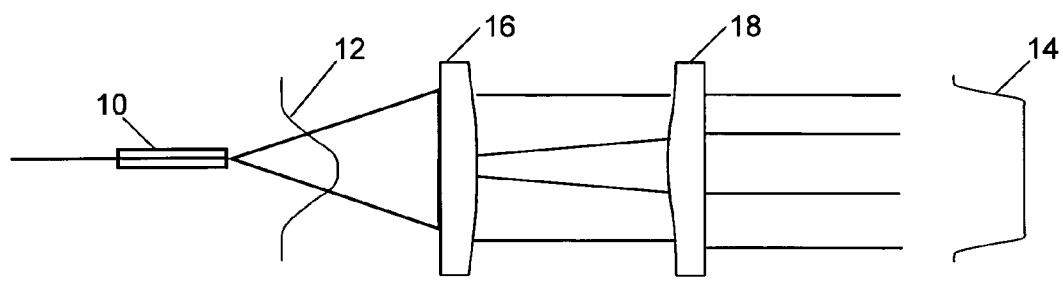
FIG. 2 is a diagram depicting transformation of a single fiber optical mode from a Bessel distribution to one with a uniform (flat-top) intensity with flat phase.
Figure 3:
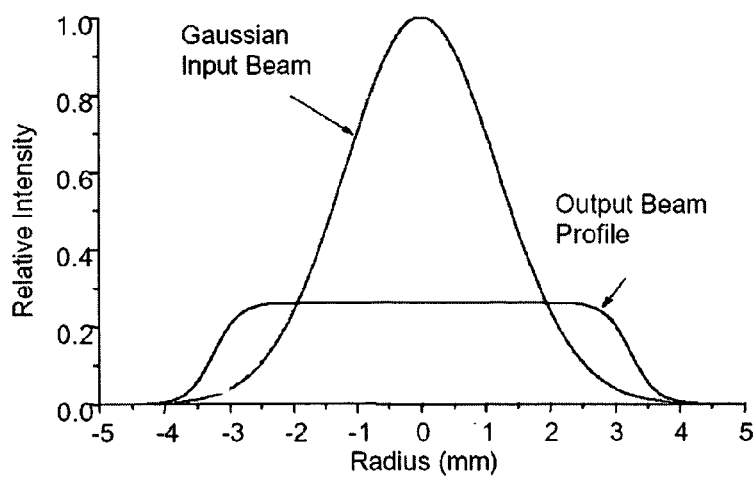
FIG. 3 is a graph showing typical input and output beam profiles associated with the transformation shown in FIG. 2.

As shown in FIG. 2, the present invention makes use of a known optical technique to transform light emitted by a fiber 10 in a mode characterized by a Bessel function, indicated by the curve 12, to more uniform "flat top" energy distribution, indicated by the curve 14. A similar transformation may be effected if the input beams have a Gaussian profile The transformation is effected by two lenses 16 and 18. The first lens 16 changes the energy distribution of the beam to one that is generally uniform across the beam. It will be observed, however, that rays emerging from near the center of the first lens 16 are still diverging, while outer rays emerging from the same lens are approximately parallel. The second lens 18 acts as a collimator for the more central rays and produces a fully collimated output beam with the uniform energy distribution shown at 14. FIG. 3 shows for comparison a Gaussian input beam distribution and a more uniform output beam profile produced by the apparatus of FIG. 2.

The type of transformation shown in FIG. 2 was disclosed by John A Hofnagle et al. in a paper entitled "Design and performance of a refractive optical system that converts a Gaussian to a flattop beam," Applied Optics, Vol. 39, No. 30, pp. 5488-5499, 20 Oct. 2000. Hofnagle et al. were not, however, concerned with arrays of fibers or other sources, but only with how to improve energy distribution across a beam from a single coherent source.

Figure 4:
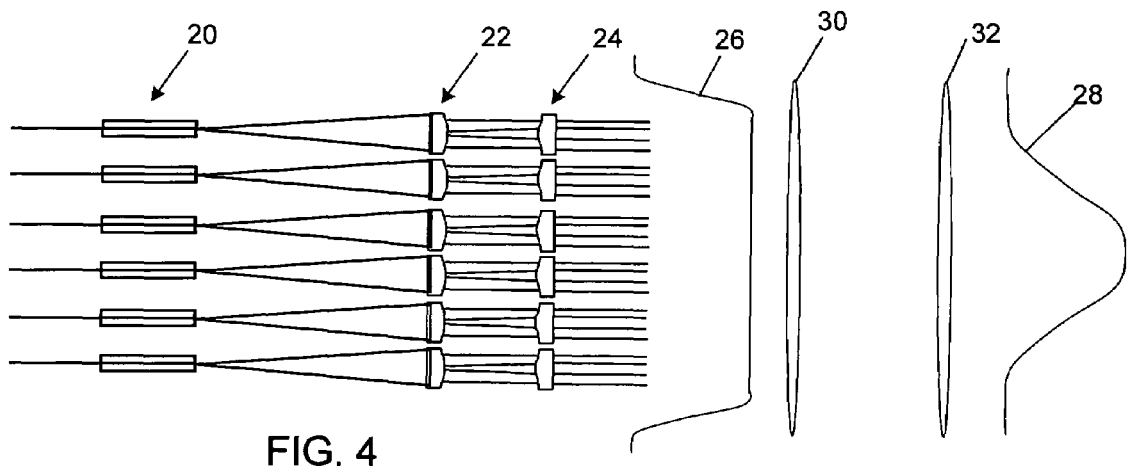
FIG. 4 is a diagram depicting the same transformation as FIG. 2 applied to an array of fibers, using a lens array, followed by a final transformation of the overall square top hat array output to a more desirable Gaussian distribution.

FIG. 4 shows the application of the same transformation principle to light beamlets emitted from a fiber array 20. Here the transformation is effected by a first array of lenses 22 and a second array of lenses 24. Each pair of lenses functions in the same way as the lenses 16 and 18 in FIG. 2, to produce a flat-top output energy distribution. Ideally, the fiber array 20 and the lens arrays 22 and 24 are geometrically designed to provide a near 100% fill factor. There are a number of ways to accomplish this. With circularly symmetric fibers and lenses, only a modestly improved fill factor is obtained by closely packing the fibers and lenses. However, a theoretical 100% fill factor is obtained if the emitting fibers 20 are centered on a square matrix pattern and the lenses 22 and 24 are not circularly symmetric but instead have a square symmetry, allowing them to be stacked in a rectangular grid with no gaps at all. Alternatively, a hexagonal symmetry allows packing at 100% fill factor using the familiar honeycomb pattern. When either of these close packing configurations is employed, the flat-top output distributions of the individual fibers and lens-pairs combine to provide an array-wide distribution that is also uniform, as indicated by the curve 26.

As also shown in FIG. 4, a final transformation is made from the flat-top array-wide energy distribution of curve 26 to a more desirable Gaussian array-wide energy distribution, shown by curve 28 and leading to far field efficiencies approaching 100%. In effect, this final transformation is the inverse of the primary transformation performed by the lens arrays 22 and 24, and is effected by two array-wide lenses 30 and 32. The lenses 30 and 32 operate in principle in the same manner as each pair of lenses in the arrays 22 and 24, except that they perform the inverse transformation and that they are wide enough to encompass the entire array of beamlets. The lenses 30 and 32 may be circularly symmetrical if the lens arrays 22 and 24 are generally circular, or may have a different symmetry to match that of the lens arrays. For example, the lens elements in the arrays 22 and 24 are square in symmetry and are stacked to form generally square arrays, then the array-wide inverse transformation lenses 30 and 32 will ideally also have a square symmetry.

The foregoing discussion of lens symmetry leads to the topic of the symmetry and pattern of the fiber array 20. The fibers in the array 20 may be stacked in different geometric patterns, the selection of which has an influence on the far field efficiency. Specifically, the fibers in the array 20 may be stacked with their centers in a square matrix or pattern, that is with the centers falling into a regular square grid pattern. Another common way to stack cylindrical objects such as fibers is with their centers each row or layer falling at the midpoints of spacing between fibers in each adjacent row or layers. This results in the fiber centers falling on the corners of contiguous equilateral triangles. Alternatively, since six such triangles define a hexagon, this fiber stacking pattern is usually referred to as a hexagonal pattern. Because the hexagonal pattern provides a greater fill factor than the square pattern, use of the former pattern results in a far field efficiency improvement.

Selection of lens shape or symmetry for the lens arrays 22 and 24 also affects the far field efficiency significantly. Using circular lenses in the arrays 22 and 24 results in far field efficiencies of approximately 65% for a square fiber pattern, and approximately 75% for a hexagonal fiber pattern, without the use of an inverse transformation back the Gaussian energy distribution. For a square lens shape in the lens arrays 22 and 24, the corresponding efficiency for a square fiber pattern is approximately 81.5%. For a hexagonal lens shape and a hexagonal fiber pattern, the efficiency is approximately 82%. When the final array-wide transformation is added, these efficiencies are further increased. For a square array of square lenses, far field efficiencies approaching 100% are attainable, but with lower efficiencies resulting from lens arrays with lower fill factors, such as circular lenses arrayed on hexagonal centers.

Design of lenses (or mirrors) in the arrays 22 and 24 follows the general principles set forth in the Hofnagle et al. paper cited above. Hofnagle deals with circularly symmetric lenses, so the design of corresponding square-symmetric lenses presents an slightly more difficult challenge for the lens designer: conversion of a circularly symmetrical Gaussian profile to a square flattop profile. Basically, the design process involves transforming each circular annulus of the input profile to a corresponding square band of the output profile. The resulting lens pair not only has an aspheric profile when viewed along any cross section, but also has surface radii of curvature that vary with angular position on the lens, as viewed along the optical axis. The lens necessarily has surface discontinuities at angular positions corresponding to the positions of the corners of its square shape. What results, however, is a lens pair that produces a square flattop energy profile from the input, circularly symmetric Gaussian input beam profile. These square lenses in the arrays 22 and 24 may be conveniently arrayed in a square matrix pattern, with virtually 100% fill factor. Similar principles may be employed to design hexagonal lens elements in the arrays 22 and 24, and these may also be arrayed in a (hexagonal) pattern with 100% fill factor.

As an alternative to using the final transformation lenses 30 and 32 of FIG. 4, the intensities of the elements of the light-emitting array 20 may be individually controlled to modify the flat-top array-wide distribution 20 to a distribution approximating the Gaussian distribution 28.

Figure 5:
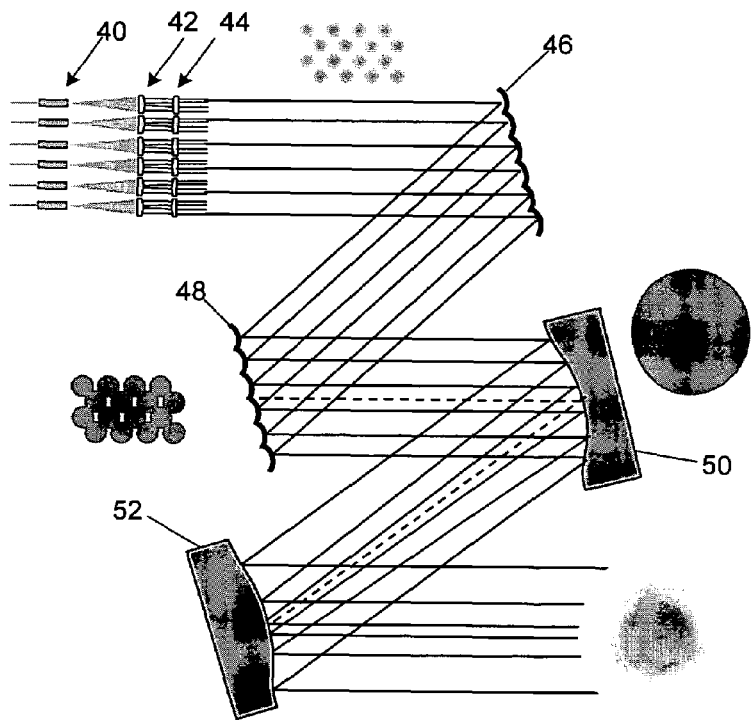
FIG. 5 is a diagram demonstrating that either of the primary and final transformations may be effected with the use of mirrors instead of lenses.
Figure 6:
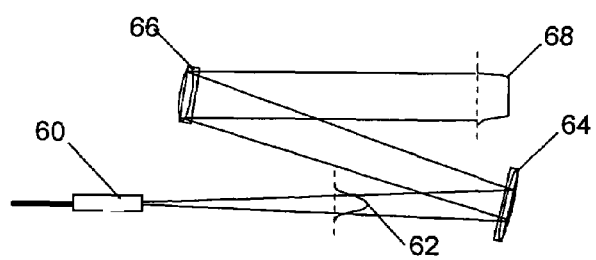
FIG. 6 is a diagram for the purpose of explaining the principle of primary transformation of each beamlet profile, using mirrors.

FIG. 5 demonstrates that the principle of the invention described above may also be implemented by use of mirrors rather than lenses. An array 40 of fibers emits radiation into two primary lens arrays 42 and 44, and then Gaussian to flat-top conversion is completed in two mirror arrays 46 and 48. Final transformation back to an array-wide Gaussian energy distribution is effected in two array-wide mirrors 50 and 52. Mirrors are preferred for some high-power applications because they are easier to cool than lenses. The principal drawback of mirrors is that they must be angularly positioned to produce off-axis beams, using a folded configuration such as the one illustrated in FIG. 5. The figure uses exaggerated angles for purposes of illustration, but it will be understood by those skilled in the optical arts that the use of angled mirrors may result in unwanted phase distortions between one edge of the beam and the other, and that such distortions should be compensated for in the design of the mirrors. FIG. 6 depicts the use of mirrors for transformation of a single beam from a fiber 60. The fiber has an end cap and produces a beam with a Gaussian energy distribution, as indicated at 62. A first mirror 64 is optimized for the Gaussian beam and reflects light to a second mirror 66, which is optimized to produce a flat-top or "top-hat" energy distribution, as indicated at 68. The mirrors 64 and 66 employ aspheric surfaces and are angled to produce a z-fold beam path as shown.

The principles of the invention as described in relation to improving far field efficiency have an additional and more general use: providing any desired amplitude and phase structure that will benefit beam propagation suitable for particular applications. For example, a Bessel beam that has a prescribed amplitude and phase structure in the near field has useful diffractive properties in that it maintains a relatively tight central lobe (high encircled energy) as it propagates in the intermediate field (between near field and far field). Such a beam would be ideal for directed beam applications in which the beam target is closer than at far field distances. As another example, for applications where the (Gaussian) far-field energy distribution is desired at varying intermediate distances, the near-field phase structure can be adjusted to focus the beam using the electronic phase control means provided by the fiber array. Yet another example includes a class of applications in which optical aberrations in the beam propagation path (e.g., atmosphere) can be substantially compensated for by controlling the near-field amplitude and phase structure of th laser output as the phase conjugate of a diffraction-limited beacon light that originated at the target.

It will be appreciated from the foregoing that the present invention represents a significant advance in the field of high power laser beams produced from bundles or arrays of fibers. In particular, the invention results in significant far field encircled energy, i.e., overall efficiency, by transforming each array beamlet from a Bessel or Gaussian distribution to a more uniform flat-top distribution and then, preferably, transforming the resulting composite beam from a flat-top distribution to a more desirable one, such as a Gaussian. It will also be appreciated that although specific embodiments of the invention have been described in detail for purposes of illustration, various modifications may be made without departing from the spirit and scope of the invention. For example, as discussed in the previous paragraph, the invention may be applied to produce a beam with desirable distributions of amplitude and phase structure at less than far field distances. Accordingly, the invention should not be limited except as by the appended claims.

The invention claimed is:

1. Apparatus providing increased encircled far field energy in a high power laser, comprising:
   an array of optical fibers, each of which emits electromagnetic radiation with a characteristic cross-sectional energy distribution; and
   first and second arrays of optical elements aligned to receive radiation from the array of fibers, wherein each optical element in the first array is an aspheric element designed to produce a uniform cross-sectional energy distribution without regard to perfect beam collimation, and wherein each optical element in the second array is an aspheric element designed to collimate radiation transmitted by the corresponding optical element in the first array;
   and wherein the combined first and second arrays of optical elements produce an array output of beamlets that form a composite output beam with a generally uniform cross-sectional energy distribution that results in an increased far field encircled energy;
   the apparatus further comprising:
   first and second array-wide optical elements disposed in the composite output beam to effect an inverse transformation of the composite output beam from a generally uniform energy distribution to a more desirable energy distribution that further increases the far field encircled energy.

2. Apparatus as defined in claim 1, wherein first and second arrays of optical elements and the first and second array-wide optical elements are selected from refractive optical elements and reflective optical elements.

3. Apparatus as defined in claim 1, wherein the optical elements in the first and second arrays are aspheric lenses.

4. Apparatus as defined in claim 1, wherein the optical elements in the first and second arrays are aspheric mirrors.

5. Apparatus as defined in claim 1, wherein:
   the array of fibers has individual fibers centered on a square pattern;
   the first and second arrays have their optical elements centered on a square pattern to receive radiation from the fibers; and
   the optical elements in the first and second arrays are square in cross-sectional shape to provide a large fill factor that also contributes to an increase in the far field encircled energy.

6. Apparatus as defined in claim 1, wherein:
   the array of fibers has individual fibers centered on a hexagonal pattern;
   the first and second arrays have their optical elements centered on a hexagonal pattern to receive radiation from the fibers; and
   the optical elements in the first and second arrays are hexagonal in cross-sectional shape to provide a large fill factor that also contributes to an increase in the far field encircled energy.

7. Apparatus as defined in claim 1, wherein:
   the array of fibers has individual fibers centered on a square pattern;
   the first and second arrays have their optical elements centered on a square pattern to receive radiation from the fibers; and
   the optical elements in the first and second arrays, and the first and second array-wide optical elements, are square in cross-sectional shape to provide a large fill factor that also contributes to an increase in the far field encircled energy.

8. Apparatus as defined in claim 1, wherein:
   the array of fibers has individual fibers centered on a hexagonal pattern;
   the first and second arrays have their optical elements centered on a hexagonal pattern to receive radiation from the fibers; and
   the optical elements in the first and second arrays, and the first and second array-wide optical elements, are hexagonal in cross-sectional shape to provide a large fill factor that also contributes to an increase in the far field encircled energy.

9. A method for providing increased encircled far field energy in a high power laser, comprising:
   emitting electromagnetic radiation from each element of an array of optical fibers, wherein each of the fibers emits radiation with a characteristic cross-sectional energy distribution;
   aligning first and second arrays of optical elements to receive radiation from the array of fibers, wherein each optical element in the first array is an aspheric element designed to produce a uniform cross-sectional energy distribution without regard to perfect beam collimation, and wherein each optical element in the second array is an aspheric element designed to collimate radiation transmitted by the corresponding optical element in the first array; and
   producing in the combined first and second arrays of optical elements an array of output beamlets that together form a composite output beam with a generally uniform cross-sectional energy distribution that results in an increased far field encircled energy;
   the method further comprising:
   disposing first and second array-wide optical elements in the composite output beam to effect an inverse transformation of the composite output beam from a generally uniform energy distribution to a more desirable energy distribution that further increases the far field encircled energy.

10. A method as defined in claim 9, wherein the more desirable energy distribution is a Gaussian distribution.

11. A method as defined in claim 9, wherein first and second arrays of optical elements and the first and second array-wide optical elements are selected from refractive optical elements and reflective optical elements.

12. A method as defined in claim 9, wherein the optical elements in the first and second arrays are aspheric lenses.

13. A method as defined in claim 9, wherein the optical elements in the first and second arrays are aspheric mirrors.

14. A method as defined in claim 9, and further comprising:
 centering individual fibers in the array of fibers on a square matrix pattern; and centering individual optical elements of the first and second arrays on a square matrix pattern to receive radiation from the fibers;
 wherein the optical elements in the first and second arrays are square in cross-sectional shape to provide a large fill factor that also contributes to an increase in the far field encircled energy.

15. A method as defined in claim 9, and further comprising:
 centering individual fibers in the array of fibers on a hexagonal matrix pattern; and
 centering individual optical elements in the first and second arrays on a hexagonal matrix pattern to receive radiation from the fibers;
 wherein the optical elements in the first and second arrays are hexagonal in cross-sectional shape to provide a large fill factor that also contributes to an increase in the far field encircled energy.

16. A method as defined in claim 9, and further comprising:
 centering individual fibers in the array of fibers on a square matrix pattern; and
 centering individual optical elements of the first and second arrays on a square matrix pattern to receive radiation from the fibers;
 wherein the optical elements in the first and second arrays, and the first and second array-wide optical elements, are square in cross-sectional shape to provide a large fill factor that also contributes to an increase in the far field encircled energy.

17. A method as defined in claim 9, and further comprising:
 centering individual fibers in the array of fibers on a hexagonal matrix pattern; and
 centering individual optical elements in the first and second arrays on a hexagonal matrix pattern to receive radiation from the fibers;
 wherein the optical elements in the first and second arrays, and the first and second array-wide optical elements, are hexagonal in cross-sectional shape to provide a large fill factor that also contributes to an increase in the far field encircled energy.

18. A method for providing increased encircled far field energy in a high power laser, comprising:
 emitting electromagnetic radiation from each element of an array of optical fibers, wherein each of the fibers emits radiation with a characteristic cross-sectional energy distribution;
 aligning first and second arrays of optical elements to receive radiation from the array of fibers, wherein each optical element in the first array is an aspheric element designed to produce a uniform cross-sectional energy distribution without regard to perfect beam collimation, and wherein each optical element in the second array is an aspheric element designed to collimate radiation transmitted by the corresponding optical element in the first array; and
 producing in the combined first and second arrays of optical elements an array of output beamlets that together form a composite output beam with a generally uniform cross-sectional energy distribution that results in an increased far field encircled energy;
 the method further comprising:
 adjusting output intensities of individual elements of the array of optical fibers, to modify the generally uniform cross-sectional energy distribution of the composite output beam to a more desirable energy distribution that further increases the far field encircled energy.

19. A method for providing desired distributions of amplitude and phase structure in a high power laser, comprising:
 emitting electromagnetic radiation from each element of an array of optical fibers, wherein each of the fibers emits radiation with a characteristic cross-sectional energy distribution;
 aligning first and second arrays of optical elements to receive radiation from the array of fibers, wherein each optical element in the first array is an aspheric element designed to produce a uniform cross-sectional energy distribution without regard to perfect beam collimation, and wherein each optical element in the second array is an aspheric element designed to collimate radiation transmitted by the corresponding optical element in the first array;
 producing in the combined first and second arrays of optical elements an array of output beamlets that together form a composite output beam with a generally uniform cross-sectional energy distribution that results in an increased far field encircled energy; and
 disposing first and second array-wide optical elements in the composite output beam to effect a further transformation of the composite output beam from a generally uniform energy distribution to a more desirable energy distribution that has the desired amplitude and phase structure in the near field and produces an optimum energy distribution at a desired range from the array.

20. A method as defined in claim 19, wherein the more desirable energy distribution is a Bessel distribution.

* * * * *